(12) United States Patent
Watanabe et al.

(10) Patent No.: US 7,497,574 B2
(45) Date of Patent: Mar. 3, 2009

(54) RETINAL IMAGE DISPLAY DEVICE

(75) Inventors: Mitsuyoshi Watanabe, Gifu-ken (JP); Shoji Yamada, Aichi-ken (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 315 days.

(21) Appl. No.: 10/369,962

(22) Filed: Feb. 19, 2003

(65) Prior Publication Data

US 2003/0156253 A1 Aug. 21, 2003

(30) Foreign Application Priority Data

Feb. 20, 2002 (JP) ............................. 2002-042650

(51) Int. Cl.
*A61B 3/00* (2006.01)
*A61B 3/14* (2006.01)

(52) U.S. Cl. ...................................... 351/206; 351/200

(58) Field of Classification Search ................ 351/200, 351/246, 206; 345/7–9; 348/115, 750, 755, 348/757; 356/124; 359/196, 237
See application file for complete search history.

(56) References Cited

U.S. PATENT DOCUMENTS

| | | | | |
|---|---|---|---|---|
| 3,860,752 A | * | 1/1975 | Adler et al. ................. | 348/795 |
| 5,355,181 A | | 10/1994 | Ashizaki et al. | |
| 5,467,104 A | * | 11/1995 | Furness et al. ................. | 345/8 |
| 5,479,185 A | * | 12/1995 | Biverot .......................... | 345/6 |
| 5,596,339 A | * | 1/1997 | Furness et al. ................. | 345/8 |
| 5,659,327 A | * | 8/1997 | Furness et al. ................. | 345/8 |
| 5,701,132 A | * | 12/1997 | Kollin et al. ................... | 345/8 |
| 5,790,284 A | * | 8/1998 | Taniguchi et al. ............. | 359/15 |
| 6,008,781 A | * | 12/1999 | Furness et al. ................. | 345/8 |
| 6,538,625 B2 | * | 3/2003 | Tidwell et al. ................. | 345/8 |
| 6,657,763 B2 | * | 12/2003 | Kobayashi .................... | 359/212 |
| 6,888,653 B2 | * | 5/2005 | Yamada et al. ............... | 359/198 |
| 2002/0141023 A1 | | 10/2002 | Yamada et al. | |
| 2003/0142086 A1 | * | 7/2003 | Watanabe et al. ............ | 345/204 |
| 2004/0196213 A1 | * | 10/2004 | Tidwell et al. ................. | 345/8 |

FOREIGN PATENT DOCUMENTS

| | | |
|---|---|---|
| JP | 4-285993 | 10/1992 |
| JP | 2874208 | 1/1999 |
| JP | 2932636 | 5/1999 |
| JP | 2001-27740 | 1/2001 |

* cited by examiner

*Primary Examiner*—Ricky L Mack
*Assistant Examiner*—Brandi N Thomas
(74) *Attorney, Agent, or Firm*—Day Pitney LLP

(57) ABSTRACT

A retinal image scanning device is provided with at least one light source that emits a light beam, an intensity modulating system that modulates the intensity of the light beam emitted by said at least one light source in accordance with a video signal, an optical system that directs the light beam to a pupil of an observer, a scanning system that scans the light beam in a first direction and in a second direction which is substantially perpendicular to the first direction so that a two-dimensional image frame defined by the first and second directions is formed on a retinal of the observer, and a wavefront curvature modulating system that modulates a wavefront curvature of the light beam when the light beam is scanned in at least one of the first direction and the second direction.

27 Claims, 8 Drawing Sheets

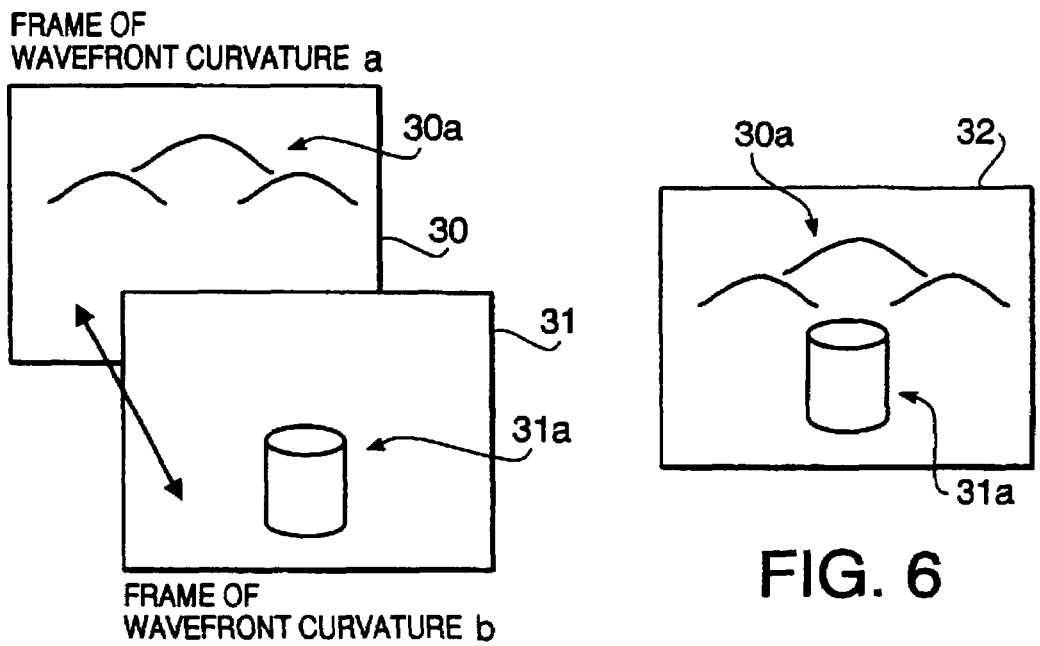
FIG. 5
FIG. 6
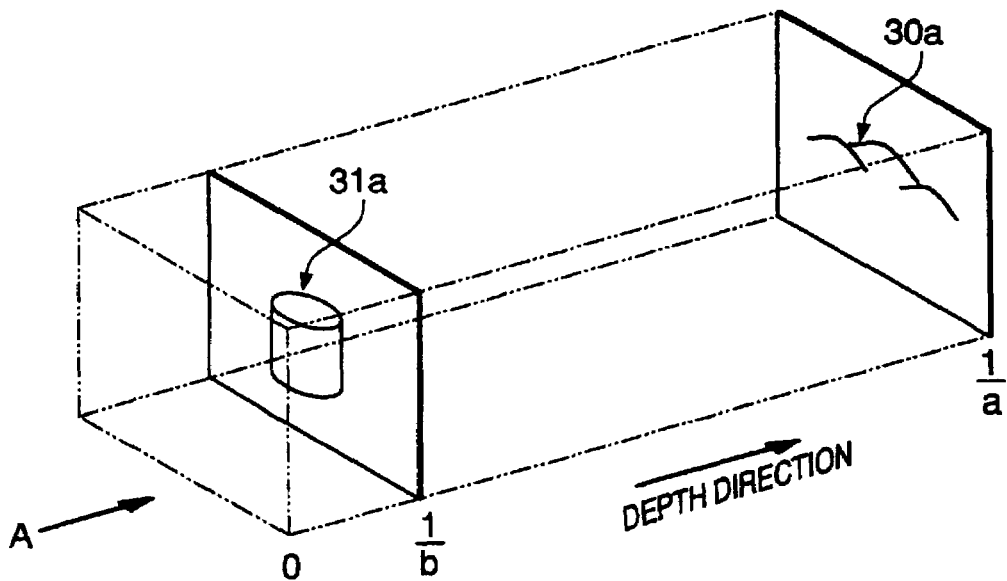
FIG. 7

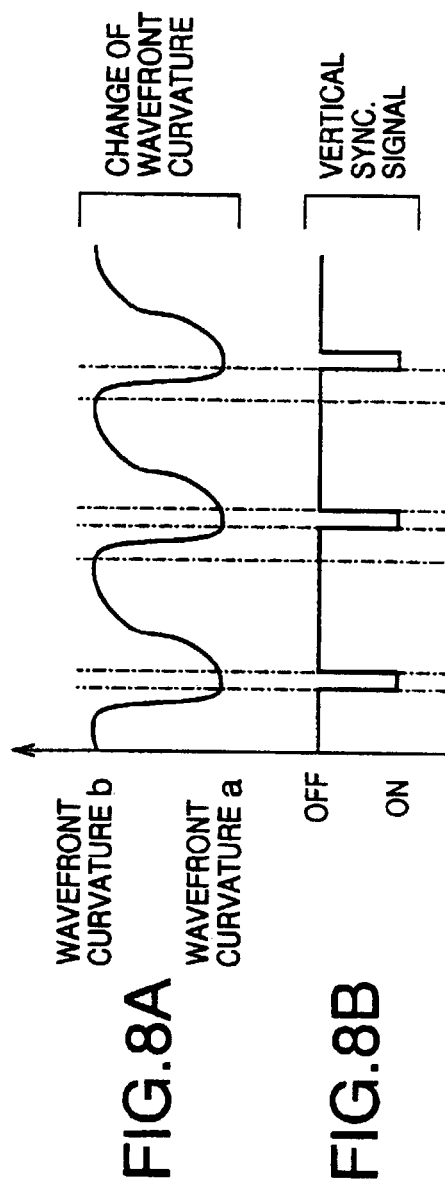
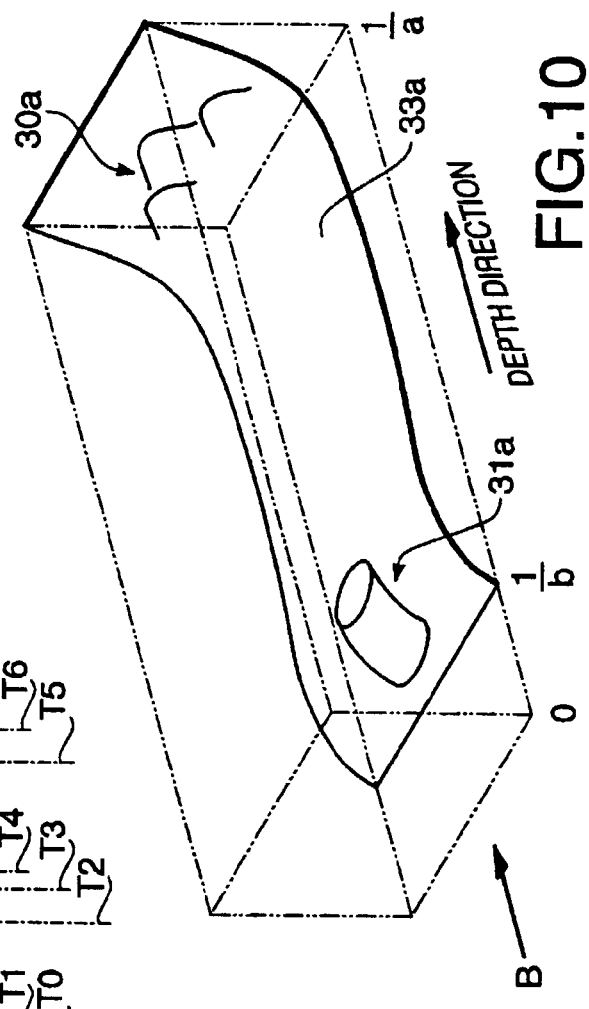
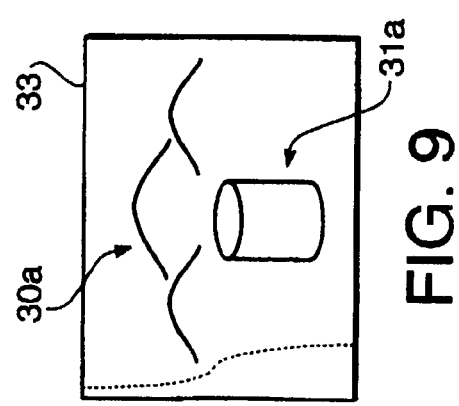

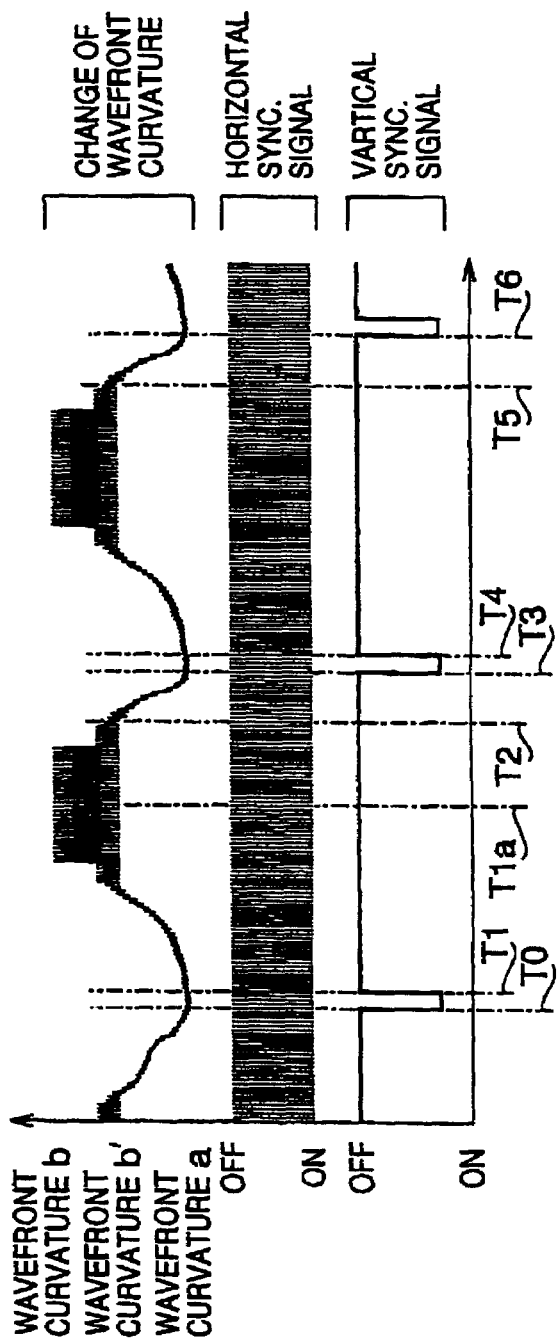
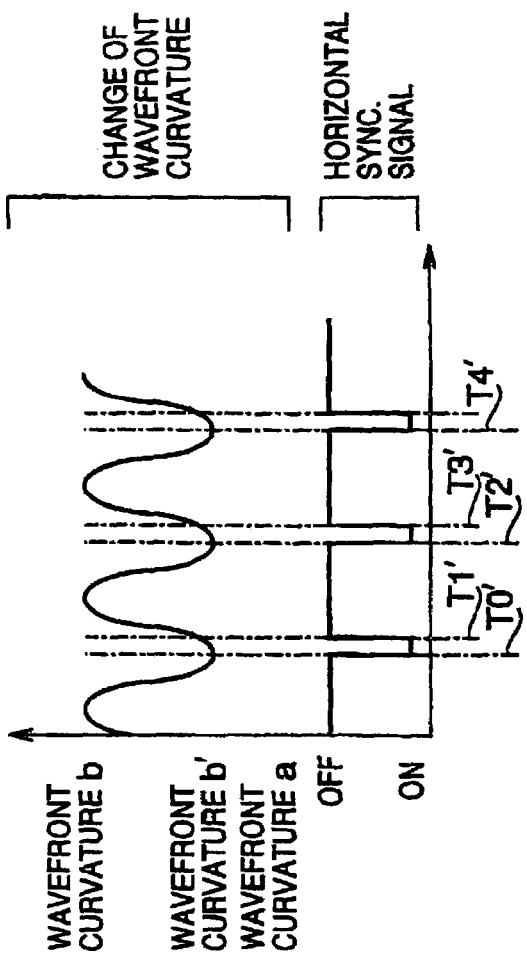

RETINAL IMAGE DISPLAY DEVICE

BACKGROUND OF THE INVENTION

The present invention relates to a retinal image display device which emits a scanning light beam into an eye of an observer to form an image on a retina of the observer.

Conventionally, a retinal image display device which directly projects an image on a retina of an observer by scanning a weak light beam on the retina has been developed. The assignee of the present invention has suggested such a display device in Japanese Patent Publication No. 2874208. Such a retinal image display device is known as a head-mounting display, which is configured such that an observer wears the display device, like spectacles, on the head. The retinal scanning display device is implemented with a wavefront curvature modulator which dynamically varies the wavefront curvature of the beam in order to provide a depth of the image formed on the retina of the observer.

Light emitted by a light source propagates as a light wave in all directions at the same phase, i.e., as isophase spherical wave. Depending on a distance between the light source and an observer, the radius of curvature of the spherical wave at the observer is different. That is, if the light source is close to the observer, an image of the light source is projected on the retina of the observer as an image having a small radius of curvature, while if the light source is remote, the image of the light source is projected on the retina of the observer as an image having a relatively large radius of curvature of the wavefront. The observer recognizes the difference of the radius of curvature with the accommodation function (i.e., focusing function) of an eye and recognizes a natural perspective, or three-dimensional feel.

In the conventional wavefront curvature modulator, a frequency of the modulation which can be applied to the wavefront curvature is relatively small in comparison with a frequency of an intensity modulation applied to each pixel of the image, i.e., a video rate. Therefore, it has been difficult to achieve a variation of focusing condition providing a natural feel in a three-dimensional view.

SUMMARY OF THE INVENTION

The present invention is advantageous in that, even if the frequency of the modulation of the wavefront curvature is relatively slow in comparison with the video rate, a natural three-dimensional view can be obtained.

According to an aspect of the invention, there is provided a retinal image scanning device, which is provided with at least one light source that emits a light beam, an intensity modulating system that modulates the intensity of the light beam emitted by said at least one light source in accordance with a video signal, an optical system that directs the light beam to a pupil of an observer, a scanning system that scans the light beam in a first direction and in a second direction which is substantially perpendicular to the first direction so that a two-dimensional image frame defined by the first and second directions is formed on a retinal of the observer, and a wavefront curvature modulating system that modulates a wavefront curvature of the light beam when the light beam is scanned in at least one of the first direction and the second direction.

With this configuration, a natural three-dimensional feel can be achieved. Further, since the three-dimensional perspective is realized by differentiating the wavefront curvatures, even through the image is viewed by one eye, it is recognized as the three-dimensional image.

Optionally, the wavefront curvature modulating system may modulate the wavefront curvature of the light beam when it is scanned in the first direction.

In a particular case, the wavefront curvature modulating system may modulate the wavefront curvature of the light beam continuously while the light beam is scanned within a scanning range in the first direction.

According to an exemplary embodiment, the wavefront curvature modulating system modulates the wavefront curvature trigonometrically.

Still optionally, the wavefront curvature modulating system may include a movable element and a piezoelectric actuator, the piezoelectric actuator being controlled to move trigonometrically.

Further optionally, the wavefront curvature modulating system may modulate the wavefront curvature of the light beam in one direction during one scanning in the first direction.

Further, the retinal image scanning device may be configured such that the wavefront curvature of the light beam at one end portion within a scanning range in the first direction corresponds to a close object. The wavefront curvature of the light beam at the other end portion within the scanning range in the first direction may correspond to a distant object.

Further optionally, the wavefront curvature modulating system may modulate the light beam such that the wavefront curvature of the light beam at a central portion within a scanning range in the first direction represents an object at a depth different from an object at a location represented by the wavefront curvature of the light beam at end portions within the scanning range in the first direction.

In a certain case, the wavefront curvature of the light beam at a central portion within a scanning range in the first direction may represent an object closer to an object at a location represented by the wavefront curvature of the light beam at end portions within the scanning range in the first direction.

Alternatively, the wavefront curvature modulating system may modulate the wavefront curvature of the light beam when it is scanned both in the first direction and in the second direction.

In this case, the wavefront curvature modulating system may modulate the wavefront curvature of the light beam continuously while the light beam is scanned within a scanning range both in the first direction and the second direction.

In a certain case, the wavefront curvature modulating system may modulate the wavefront curvature trigonometrically. Further, the wavefront curvature modulating system may include a movable element and a piezoelectric actuator, the piezoelectric actuator being controlled to move trigonometrically.

Optionally, the wavefront curvature of the light beam at one end portion within a scanning range in the first direction may correspond to a close object, and the wavefront curvature of the light beam at the other end portion within the scanning range in the first direction may correspond to a distant object.

In this case, the first direction may be a vertical direction.

In an exemplary embodiment, the wavefront curvature modulating system modulates the light beam such that the wavefront curvature of the light beam at a central portion within a scanning range in the second direction represents an object at a depth different from an object at a location represented by the wavefront curvature of the light beam at end portions within the scanning range in the second direction.

Optionally, in this case, the wavefront curvature of the light beam at a central portion within a scanning range in the second direction may represent an object closer to an object at a location represented by the wavefront curvature of the light beam at end portions within the scanning range in the second direction.

In a certain case, for the one end portion within the scanning range in the first direction, the wavefront curvature of the light beam in the second scanning direction is changed little, and for the other end portion within the scanning range in the first direction, the wavefront curvature of the light beam in the second scanning direction is changed such that the wavefront curvature of the light beam at a central portion within the scanning range in the second direction represents an object at a depth different from an object at a location represented by the wavefront curvature of the light beam at end portions within the scanning range in the second direction.

Optionally, the first direction may be a vertical direction and the second direction may be a horizontal direction.

Further optionally, the retinal image scanning device may be provided with a synchronizing signal generating system that outputs a first synchronizing signal having a first frequency and a second synchronizing signal having a second frequency, the scanning system scans the light beam in the first direction and in the second direction synchronously with the first and second synchronizing signals, respectively.

In this case, the second frequency may be higher than the first frequency, and the wavefront curvature modulating system may modulate the wavefront curvature of the light beam such that the wavefront curvature changes little in the second direction, and the wavefront curvature changes in the first direction.

According to another aspect of the invention, there is provided a retinal image scanning device, which is provided with at least one light source that emits a light beam, an intensity modulating system that modulates the intensity of the light beam emitted by the at least one light source in accordance with a video signal, an optical system that directs the light beam to a pupil of an observer, a scanning system that scans the light beam in a first direction and in a second direction which is substantially perpendicular to the first direction so that a two-dimensional image frame defined by the first and second directions is periodically formed on a retinal of the observer, and a wavefront curvature modulating system that modulates a wavefront curvature of the light beam. With this configuration, the wavefront curvature modulating system may operate such that the wavefront curvature of the light beam forming the same image frame is substantially constant, the wavefront curvature of the light beam being changed only when frame image is switched to another frame.

Still optionally, the wavefront curvature modulating system may periodically change the wavefront curvature of the light beam every time when the frame image is formed.

Further, the wavefront curvature modulating system may modulate the wavefront curvature of the light beam so as to have first curvature and second curvature alternately as the image frames are formed one after another.

According to a further aspect of the invention, there is provided a retinal image scanning device, which includes at least one light source that emits a light beam, an intensity modulating system that modulates the intensity of the light beam emitted by the at least one light source in accordance with a video signal, an optical system that directs the light beam to a pupil of an observer, a scanning system that scans the light beam in a first direction and in a second direction which is substantially perpendicular to the first direction so that a two-dimensional image frame defined by the first and second directions is formed on a retinal of the observer, a synchronizing signal generating system that outputs a first synchronizing signal having a first frequency and a second synchronizing signal having a second frequency, the scanning system scans the light beam in the first direction and in the second direction synchronously with the first and second synchronizing signals, respectively, and a wavefront curvature modulating system that modulates a wavefront curvature of the light beam synchronously with the first synchronizing signal when the light beam is scanned in the first direction.

In one case, a first period, which is a reciprocal number of the first frequency, of the first synchronizing signal may be substantially equal to a period of modulation, in the first direction, performed by the wavefront modulating system.

Alternatively, a first period, which is a reciprocal number of the first frequency, of the first synchronizing signal may be substantially a half a period of modulation, in the first direction, performed by the wavefront modulating system.

Further, a second period, which is a reciprocal number of the second frequency, of the second synchronizing signal is substantially equal to a period of modulation, in the second direction, performed by the wavefront modulating system.

In this case, a first period, which is a reciprocal number of the first frequency, of the first synchronizing signal may optionally be substantially a half a period of modulation, in the first direction, performed by the wavefront modulating system.

BRIEF DESCRIPTION OF THE ACCOMPANYING DRAWINGS

FIG. 1 shows a configuration of a retinal image scanning display device to which embodiments of the invention can be applied;

FIG. 2 schematically shows a configuration of a wavefront curvature modulation system according to a first embodiment;

FIG. 3 schematically shows a principle of modification of the wavefront curvature by a wavefront curvature modulation system shown in FIG. 2;

FIG. 5 shows two images, which have different wavefront curvatures and formed alternately;

FIG. 6 is a synthesized image by combining the two images shown in FIG. 5;

FIG. 7 shows depths of the two images shown in FIG. 5;

FIGS. 8A and 8B show a timing chart according to a second embodiment, in which the modulating frequency of the wavefront curvature is equal to a frequency of the vertical synchronizing signal;

FIG. 9 is an image formed by a scanning beam which is modulated such that the wavefront curvature thereof is different in the vertical direction;

FIG. 10 shows a three-dimensional arrangement of the image shown in FIG. 9 corresponding to the distribution of the wavefront curvatures of the scanning beam forming the image;

FIGS. 11A, 11B and 11C show a timing chart showing a relationship between the modulation of the wavefront curvature, a vertical synchronizing signal and a horizontal synchronizing signal, according to a third embodiment;

FIGS. 12A and 12B show a timing chart indicating a relationship between the wavefront curvature and the horizontal synchronizing signal at about timing T1 a in FIG. 11;

DESCRIPTION OF THE EMBODIMENTS

Hereinafter, a retinal image scanning display to which embodiments of the present invention can be applied will be described with reference to the accompanying drawings.

Figure 1:
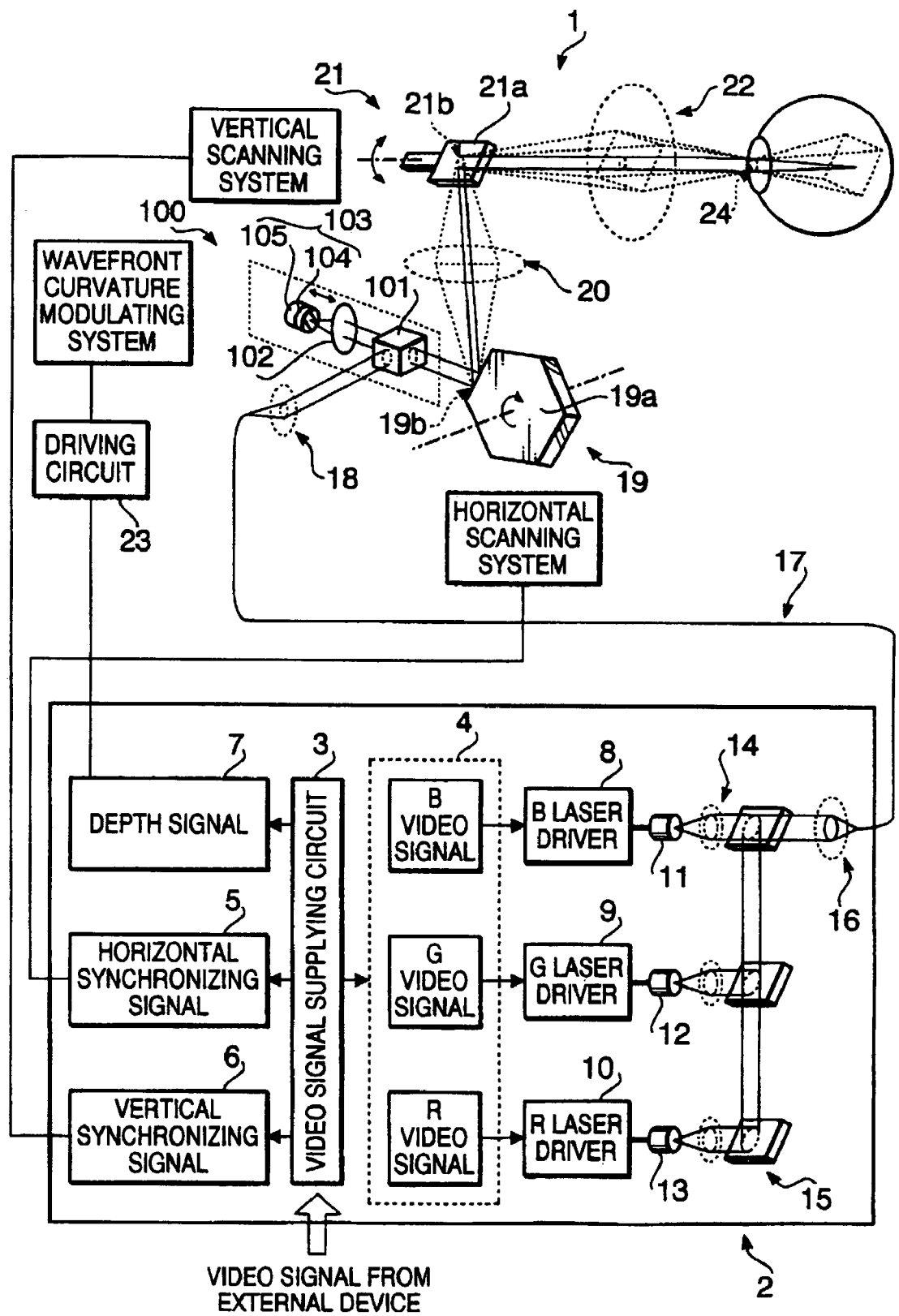

FIG. 1 shows a configuration of a retinal image scanning display device 1, which employs a retinal scanning system.

As shown in FIG. 1, the retinal image scanning display device 1 includes a light source unit 2 that processes video signals supplied by an external device.

The light source unit 2 is provided with a video signal supplying circuit 3, which receives the video signal from the external device and generates signals for displaying an image. Specifically, the video signal supplying circuit 3 outputs a video signal 4, a horizontal synchronizing signal 5, a vertical synchronizing signal 6 and a depth signal 7.

The light source unit 2 is further provided with R (red) laser diode 13, G (green) laser diode 12 and B (blue) laser diode 11 respectively driven in accordance with R, G and B components of the video signal 4 supplied from the video signal supplying circuit 3. Specifically, the R, G and B components of the video signal 4 are input to R laser driver 10, G laser driver 9 and B laser driver 8 which drive the R, G and B laser diodes 13, 12 and 11, respectively. It should be noted that the light source need not be limited to the laser diodes, and another type of light source such as a solid-state laser may be employed.

In front of (on light emitting side of) the R, G and B laser diodes 13, 12 and 11, first collimating optical systems 14 are arranged, respectively, for collimating the laser beams respectively emitted by the R, G and B laser diodes 13, 12 and 11.

The laser beams emitted by the R, G and B laser diodes 13, 12 and 11 are incident on dichroic mirrors 15 which selectively transmit/reflect beams incident thereon depending on wavelengths of the beams. Specifically, as shown in FIG. 1, the dichroic mirrors 15 are configured/arranged such that the laser beams emitted by the R, G and B laser diodes 13, 12 and 11 are finally combined and incident on an imaging optical system 16 as a single laser beam including the R, G and B components.

The combined beam is converged on an entrance end surface of an optical fiber by the imaging optical system 16.

The retinal image scanning display device 1 further includes a second collimating optical system 18 that collimates the laser beam emitted from the light source unit 2, a wavefront curvature modulating system 100 that modulates a wavefront curvature of the collimated laser beam, a horizontal scanning system 19 that scans the modulated laser beam in a horizontal direction using a polygonal mirror 19a, and a vertical scanning system 21 that scans the laser beam output by the horizontal scanning system 19 and incident on the vertical scanning system 21 via a first relaying optical system 20. The vertical scanning system 21 includes a galvano mirror 21a that scans the laser beam, which scans in the horizontal direction, in the vertical direction. Thus, the laser beam reflected by the galvano mirror 21a scans two-dimensionally.

The scanning beam is incident on a pupil 24 of an observer via a second relaying optical system 22.

It should be noted that the first relaying optical system 20 is arranged such that a surface of the polygonal mirror 19a and the deflection surface of the galvano mirror 21a have a conjugate relationship. Further, the second relaying optical system 22 is arranged such that the deflection surface of the galvano mirror 21a and the pupil 24 of the user have a conjugate relationship.

The driving circuit 23 drives the wavefront curvature modulating system 100 in accordance with the depth signal 7 output by the video signal supplying circuit 3. The horizontal scanning system 19 and the vertical scanning system 21 are connected with the video signal supplying circuit 3, and scan the laser beam synchronously with the horizontal synchronizing signal 5 and the vertical synchronizing signal 6, respectively.

Figure 2:
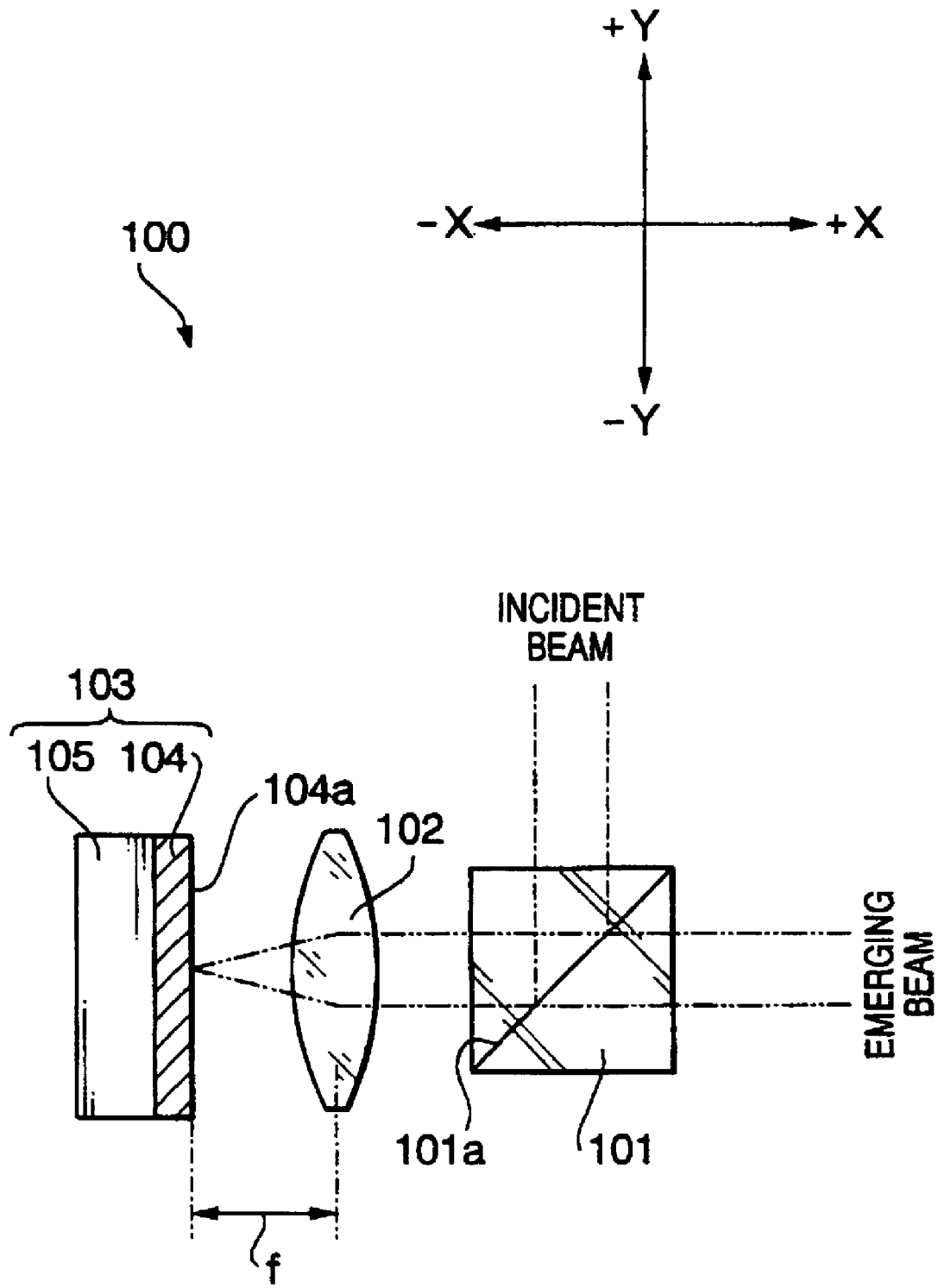

As shown in FIG. 2, the wavefront curvature modulating system 100 includes a beam splitter 101 that splits an incident laser beam into a transmitted beam passed through the beam splitter 101 and a reflected beam which is reflected by the beam splitter 101 and directed in a direction perpendicular to the transmitted beam.

The wavefront curvature modulating system 100 further includes a convex (positive) lens 102 that has a positive power and converges the reflected beam, and a movable mirror 103 that reflects back the beam converged by the convex lens 102 toward the convex lens 102. The focal length of the convex lens 102 is f.

According to the present embodiment, the beam splitter 101 is configured such that a pair of rectangular prisms are cemented at the oblique surfaces, with dielectric multiple-layer film being provided therebetween, and that the cemented prisms form a cubic shape. The oblique surfaces and the dielectric multiple-layer film constitute a beam splitting surface 101a (i.e., a half-mirror surface), which is configured and arranged to transmit approximately 50 percents of the incident beam and to reflect approximately 50 percents of the incident beam in a direction perpendicular to a direction where the transmitted beam proceeds.

As shown in FIG. 2, the movable mirror 103 is configured such that a reflection (mirror) surface 104a of a mirror 104, which is a transparent plate member such as a glass plate applied with a mirror coating metallic layer, and a piezoelectric actuator 105 having multiple layers of piezoelectric elements. The piezoelectric actuator 105 is driven as a driving voltage is applied by the driving circuit 23. When the piezoelectric actuator 105 is driven, a positional relationship between the mirror 104 and the convex lens 102 is changed in a direction perpendicular to a plane of the reflection surface 104a (X-axis direction in the drawings). It should be noted that the central axis of the laser beam reflected by the reflection surface 104a and passed through the positive lens 102 and the central axis of the beam passed through the beam splitter 101 are on the same line.

Next, an operation of the retinal image scanning display device 1 will be described in detail with reference to FIG. 1.

When the video signal supplying circuit 3 receives a video signal from the external device, the video signal supplying circuit 3 generates the R video signal, G video signal and B video signal respectively corresponding to R, G and B components, the horizontal synchronizing signal 5, the vertical synchronizing signal 6 and the depth signal 7.

The R laser driver 10, G laser driver 9 and the B laser driver 8 output, in accordance with the input R, G and B video signals, driving signals to the R laser diode 13, G laser diode 12 and B laser diode 11, respectively. The laser diodes 13, 12 and 11 emit the laser beams in accordance with the driving signals output by the R laser driver 10, G laser driver 9 and the B laser driver 8. The emitted laser beams are collimated by the first collimating optical systems 14, and are combined into a single beam via the dichroic mirrors 15. The combined beam is then converged on the end surface of the optical fiber 17 by the imaging optical system 16. The laser beam transmitted by and emerged from the optical fiber 18 is collimated by the second collimating optical system 18 and is incident on the wavefront curvature modulating system 100. The operation of the wavefront curvature modulating system 100, which modulates the wavefront curvature of the beam, will be described in detail later.

The laser beam emitted by the wavefront curvature modulating system 100 is incident on the deflection surface 19b of the polygonal mirror 19a. With use of a BD (Beam Detector) sensor (not shown), a rotation speed of the polygonal mirror 19a is detected. Further, the rotation speed and phase are adjusted based on the output of the BD sensor and the horizontal synchronizing signal 5 output by the video signal supplying circuit 3.

The laser beam incident on the deflection surface 19b of the polygonal mirror 19a is scanned in the horizontal direction, and incident on the galvano mirror 21a via the first relaying optical system 20.

The first relaying optical system 20 is arranged such that the deflection surface 19b of the polygonal mirror 19a and the deflection surface 21b of the galvano mirror 21a have a conjugate relationship. Further, a facet error (i.e., tilt of the deflection surfaces 19b) is compensated by the relaying optical system 20.

The galvano mirror 21a is controlled to swing synchronously with the vertical synchronizing signal so that the laser beam scans in the vertical direction.

Thus, the laser beam scans in the horizontal direction by the polygonal mirror 19a, and in the vertical direction by the galvano mirror 21a, thereby the laser beam scanning in two-dimensional directions.

The scanning laser beam is incident on the second relaying optical system 22, and then is projected on the retina of the observer via the pupil 24 of the observer. With this configuration, the observer can view the image which is directly formed on the retina with the scanning laser beam.

Next, with reference to FIGS. 2 and 3, a method of modifying the wavefront curvature will be described.

Figure 3:
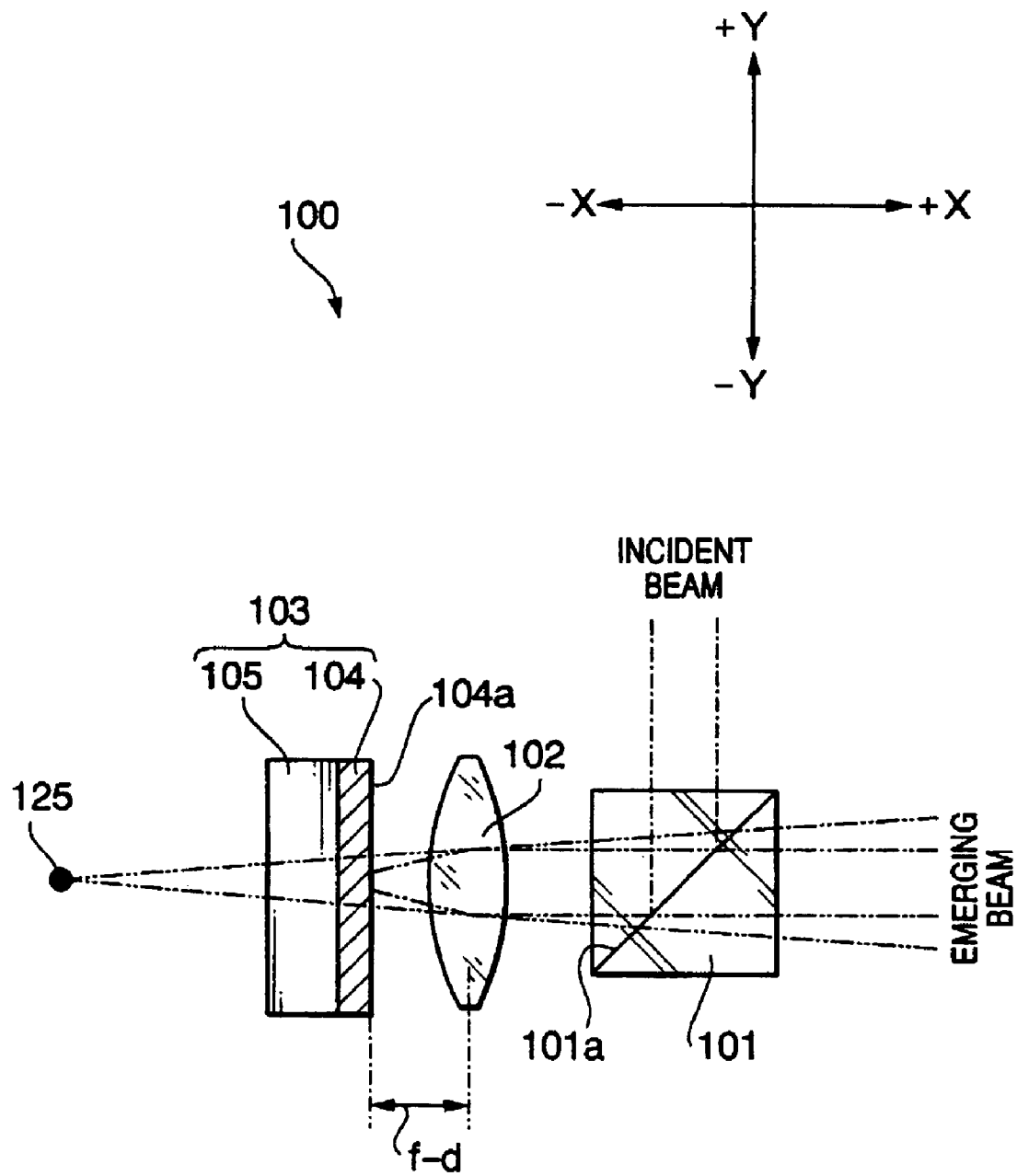

FIGS. 2 and 3 show how the laser beam is modulated by the wavefront curvature modulation system 100.

As shown in FIG. 2, the laser beam collimated by the second collimating optical system 18 is incident on the beam splitter 101. In the example shown in FIG. 2, the incident beam proceeds from the +Y direction to the −Y direction. As described above, approximately 50% of the incident beam is reflected by the oblique surface 101a, and approximately 50% of the incident beam is transmitted through the oblique surface 101a.

The reflected beam (i.e., the beam reflected by the oblique surface 101a) is incident on the convex lens 102.

It should be noted that, when the driving voltage applied by the driving circuit 23 to the piezoelectric actuator 105 is zero or the predetermined reference voltage, a reflection surface 104a of the mirror 104 of the movable mirror 103 is located at a position spaced from the principal point of the convex lens 102 by a distance f, which is the focal length of the convex lens 102.

Since the distance between the mirror surface 104a and the principal point of the positive lens 102 is equal to the focal length f, the laser beam reflected by the oblique surface 101a and incident on the positive lens 102 is converged on the reflection surface 104a. The beam is then reflected by the reflection surface 104a and incident on the positive lens 102 as diverging light.

Since the beam reflected by the reflection surface 104a has a diverging angle which is the same as the converging angle of the beam incident on the reflection surface 104a, and since the reflected beam proceeds along the same optical path as that of the incident beam, the reflected beam is collimated, by the convex lens 102, to have substantially the same diameter of the beam proceeding from the beam splitter 101 to the convex lens 102.

The beam reflected by the reflection surface 104a and collimated by the positive lens 102 is incident on the beam splitter 101. Approximately 50% of the incident beam is transmitted through the oblique surface 101a, and emerges from the beam splitter 101 in a direction perpendicular to the beam incident on the beam splitter from the second collimating optical system 18.

When a certain voltage is applied by the driving circuit 23 to the piezoelectric actuator 105, the movable mirror 104 is displaced in +X direction. In an example shown in FIG. 3, by the movement of the movable mirror 104, a distance between the reflection surface 104a and the principal point of the convex lens 102 is reduced to f−d.

The laser beam emerged from the second collimating optical system 18 is incident on the beam splitter 101, and 50% thereof is reflected by the oblique surface 101a. The beam reflected by the oblique surface 101a is converged by the convex lens 102. As shown in FIG. 3, since the distance between the reflection surface 104a and the principal point of the convex lens 102 is less than the focal length, the laser beam is not converged on the reflection surface 104a. The laser beam is reflected by the reflection surface 104a, and converges after proceeding by a distance d. That is, the laser beam converges at a position whose distance with respect to the principal point of the convex lens 102 is f−2d, and then incident on the convex lens 102 as a divergent beam.

The convex lens 102 refracts the incident beam in a converging direction. However, since the reflected laser beam is converged at a position closer to the convex lens 102 than the focal point thereof, the laser beam reflected and the incident on the convex lens 102 is not collimated or converged by the convex lens 102. Accordingly, the beam passed through the lens 102 is incident on the beam splitter 101 as the diverging light. Approximately 50% of the light incident on the beam splitter 101 transmits the oblique surface 101a and proceeds as the diverging light beam, as shown in FIG. 3. Thus, in this case, the wavefront curvature modulating system 100 emits a laser beam having a certain divergence, i.e., a beam having a relatively large wavefront curvature.

The beam emerged from the wavefront modulating system 100 is incident on the polygonal mirror 19a. The beam on the deflection surface 19b of the polygonal mirror 19a has the same wavefront curvature as a spherical light wave emitted from an apparent light emitting point 125 indicated in FIG. 3. When the distance between the reflection surface 104a and the principal point of the lens 102 is f, the wavefront curvature of the light beam on the deflection surface 19b is the same as the light emitted from an apparent light emitting point at the infinity.

As mentioned above, the first relaying optical system 20 is arranged such that the deflection surface 19b of the polygonal mirror 19a and the deflection surface 21b of the galvano mirror 21a have a conjugate relationship. Further, the second relaying optical system 22 is arranged such that the deflection surface 21b of the galvano mirror 21a and the position of the pupil 24 of the observer have the conjugate relationship. Therefore, the deflection surface 19b and the pupil 24 also have the conjugate relationship. Therefore, the wavefront curvature of the laser beam on the deflection surface 19b of the polygonal mirror 19a is the same as the wavefront curvature at the pupil 24 of the observer.

When the observer focuses on the apparent light emitting point 125 of the laser beam incident on the pupil 24, the incident laser beam converges on the retina of the observer.

In the meantime, since the observer can recognize differences of the wavefront curvatures of the laser beam by the focusing (i.e., a so-called ocular accommodation), the observer can recognize the perspective based on the differences of the wavefront curvatures of the laser beam.

That is, when the wavefront curvature is relatively large, the observer feels that the light emitting point is closer, while when the wavefront curvature is relatively small, the observer feels that the light emitting point is farther.

For example, if the focal length of the convex lens 102 is 4 mm, by moving the movable mirror 103 within a range of approximately 30 μm, the wavefront curvature modulating system 100 can express the perspective within a range of approximately 30 cm to the infinity.

If the focal length of the convex lens 102 is 2 mm, by moving the movable mirror 103 within a range of approximately 10 μm, the wavefront curvature modulating system 100 can express the perspective within a range of approximately 30 cm to the infinity.

For example, when the substantially parallel light beam whose wavefront curvature is substantially planar is scanned and projected on the retina, the observer recognizes that the image is located on a screen at tens of meters away from the observer. When the light beam whose wavefront curvature is relatively large is scanned and projected on the retina, the observer recognizes that the image is located on a screen, for example, at tens of centimeters away from the observer.

Next, a relationship between a period of modulation of the wavefront curvature applied by the wavefront curvature modulating system 100 and generating periods of the horizontal and vertical synchronizing signals 5 and 6 will be described.

First Embodiment

Firstly, the relationship for the retinal image scanning display device 1 according to the first embodiment will be described with referenced to FIGS. 1 and 4 through 7.

FIGS. 4A and 4B show a timing chart when the modulating frequency of the wavefront curvature is half a frequency of the vertical synchronizing signal. FIG. 5 shows two images, which have different wavefront curvatures a and b and formed alternately by the modulated beam. FIG. 6 is a synthesized image 32 which is obtained by synthesizing the two images shown in FIG. 5, which have different wavefront curvatures. FIG. 7 shows depths of the two images shown in FIG. 5.

Figure 4:
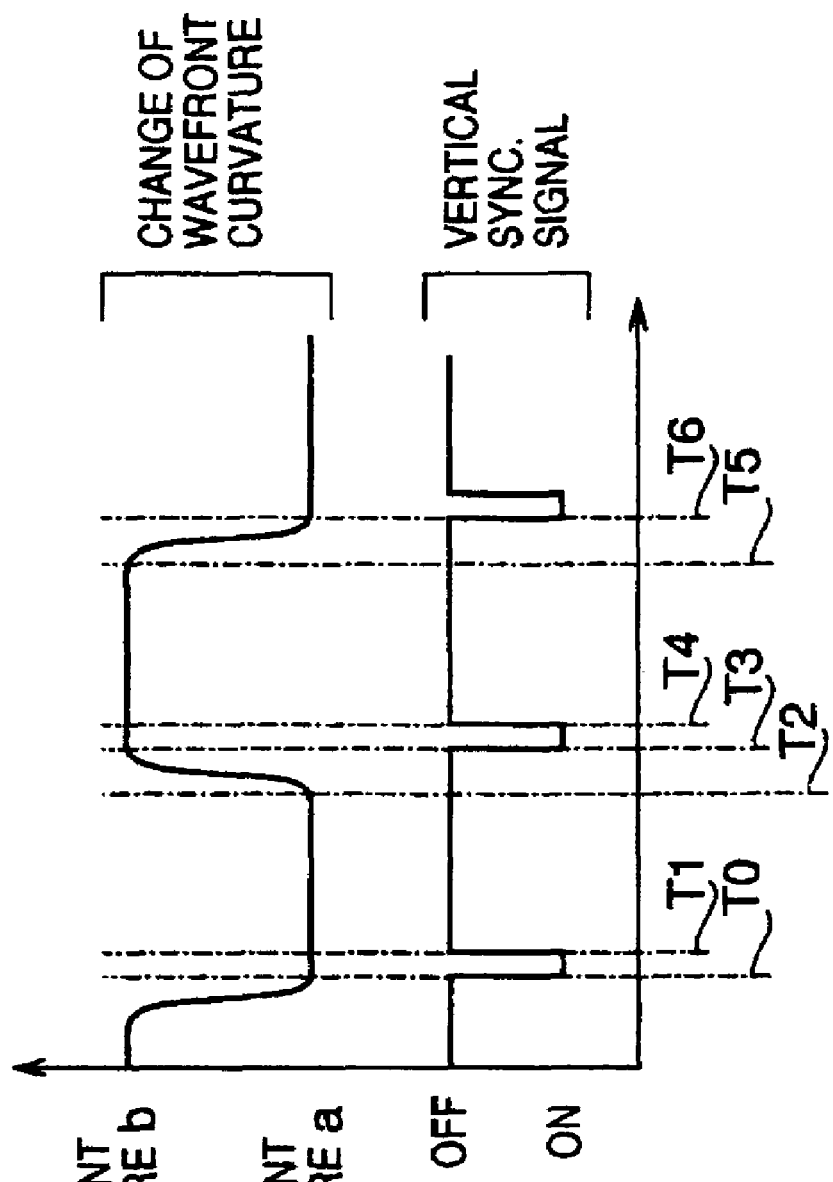
FIGS. 4A and 4B show a timing chart when the modulating frequency of the wavefront curvature is half a frequency of the vertical synchronizing signal.

In the example shown in FIGS. 4 and 5, it is assumed that the wavefront curvature a is smaller than the wavefront curvature b. In such a case, a radius of the wavefront curvature is greater than a radius of the wavefront curvature b. For example, the radius of the wavefront curvature a is infinity and the radius of the wavefront curvature b is 1 m, then a frame 30 (wavefront curvature: a) is recognized to be located far from the observer, and the frame 31 (wavefront curvature: b) is recognized to be located at 1 m from the observer.

According to the embodiment, a frame of image is formed by 640×480 pixels, and 60 frames of images are formed per second.

For example, when the polygonal mirror 19a of the horizontal scanning system 19 receives the horizontal synchronizing signal 5, the polygonal mirror 19a (which is assumed to be a hexagonal shape in this example) rotates ⅙ revolution, during which the laser beam is scanned to form one line (i.e., horizontal scanning line) of the image, i.e., 480 pixels in the horizontal direction. It should be noted that the number of deflection surfaces 19b of the polygonal mirror 19a need not be limited to six, and can be any number (i.e., either greater or smaller than six) which is practically usable. For example, the number of deflection surfaces may be 48.

The laser beam scanning in the horizontal direction is further scanned in the vertical direction by the vertical scanning system 21. Specifically, every time when the vertical scanning system 21 receives the vertical synchronizing signal 6, the galvano mirror 21a reciprocates (swings) in the vertical scanning direction. During a swing movement of the galvano mirror 21a in one direction, the beam moves in the vertical scanning direction by 640 pixels. Therefore, during a one-way swing movement of the galvano mirror 340, 640 line images are formed. If one frame of the image is formed in 1/60 seconds, the observer may recognize a frame of an image as an image including approximately 300,000 (≅640×480) image pixels which are simultaneously displayed. For example, a home video game shows 60 frames of images per second, and a television set or a video player displays 30 frames/second (NTSC). In a case of a motion picture projector, 24 frames of images are projected in one second, with this speed practically sufficient effect can be obtained. As described above, in the retinal image scanning display device 1, by scanning the laser beam repeatedly, frames of images are repeatedly formed at a speed of 60 frames/second.

If the period of wavefront modulation applied by the wavefront curvature modulating system 100 is set to be twice the period of the vertical synchronizing signal 6, and if one image is formed at every one period of the vertical synchronizing signal 6, the wavefront modulation is applied such that the modulation for one period is applied every time when two images are formed by the retinal image scanning display device 1.

As shown in FIGS. 4A and 4B, when the vertical synchronizing signal 6 is ON (at time T0), scanning of the laser beam by the galvano mirror 21a is started. At this stage, the wavefront curvature modulating system 100 has been driven so that the wavefront curvature of the modulated laser beam is a. At times T0, T1 and T2 the wavefront curvature of the laser beam incident on the vertical scanning system 21 via the wavefront curvature modulating system 100 and the horizontal scanning system 19 remains to be a.

On scanning of the vertical scanning system 21 started at time T0 is finished at time T2 and an image formation of one frame is finished. In this cycle, a frame having the wavefront curvature of a, i.e., the frame 30 shown in FIG. 5 (an image of a far object) is formed. When the observer views the frame 30, the image 30a in the frame 30 is recognized by the observer as an image at the infinity from the observer. As shown in FIG. 4B, the vertical synchronizing signal is OFF at time T1.

Next, from time T2 to time T3 the wavefront curvature modulating system 100 is driven so that the wavefront curvature of the beam is b. By time T2 the first frame has been formed, and during an interval from time T2 to time T3 the laser beam is not emitted.

From time T3 to T6, an operation similar to that from time T0 to T3 is performed. In this case, however, the wavefront curvature modulating system 100 is driven so that the wavefront curvature of the laser beam emitted from time T4 to time T5 is b. At time T5, the frame 31 in FIG. 5 (a close object) is formed, whose wavefront curvature is b. When the observer views the frame 31, the image 31a in the frame 31 is recognized by the observer as an image at a relatively close location, for example, 1 m from the observer. As shown in FIG. 4B, the vertical synchronizing signal is OFF at time T4.

Thereafter, the operation similar to that from time T0 to T6 described above will be repeated. For example, if the vertical synchronizing signal 6 repeats ON and OFF states 60 times in one second, the retinal image scanning display device 1 repeats the operation in time T0 through time T6 at a frequency of 30 times per second.

Since the frame 30 having the wavefront curvature of a is projected at the frequency of 30 times per second, and the frame 31 having the wavefront curvature of b is projected at the frequency of 30 times per second, which are projected alternately, the observer recognizes the two images as a superimposed single image due to an after-image effect. That is, the observer recognizes the image such that the remote object 30a and the close object 31a are included in a single image frame.

Further, as shown in FIG. 7, the synthesized image 32 is recognized by the observer as images 30a and 31a viewed from arrow A.

The observer views the images 30a and 31a, and feels that the image 31a is located on a plane which is perpendicular to the depth direction and located at a distance 1/b with respect to the point 0, and that the image 30a is located on a plane which is perpendicular to the depth direction and located at a distance 1/a with respect to the point 0. As aforementioned, 1/a and 1/b represent radii of wavefront curvatures a and b.

Second Embodiment

Next, the retinal image scanning display device 1 according to the second embodiment will be described with referenced to FIGS. 1 and 8 through 10.

FIGS. 8A and 8B show a timing chart when the modulating frequency of the wavefront curvature is equal to a frequency of the vertical synchronizing signal. FIG. 9 is a synthesized image 33 which is obtained by synthesizing two images, which have different wavefront curvatures. FIG. 10 shows depths of the synthesized image.

If the period of the wavefront modulation applied by the wavefront curvature modulating system 100 is set to be equal to or less than the period of the vertical synchronizing signal 6, an image which includes portions having different wavelength curvatures can be formed.

In particular, if the period of the wavefront curvature modulation applied by the wavefront curvature modulating system 100 is equal to the period of the vertical scanning system 21, at every period of the vertical synchronizing signal 6, image formation of one frame is executed. Accordingly, the modulation of the wavefront curvature of the laser beam is performed such that one period of modulation is applied in one frame of image.

As shown in FIGS. 8A and 8B, when the vertical synchronizing signal 6 is ON (at time T0), scanning of the laser beam by the galvano mirror 21a is started. At this stage, the wavefront curvature modulating system 100 is driven so that the wavefront curvature is a. During times T0 through T2 the wavefront curvature changes from a to b in accordance with a function like a trigonometrical function. That is, the wavefront curvature of the laser beam changes from a to b synchronously with the scanning operation of the vertical scanning system 21. Then, the modulation started at time T0 is competed at time T2 at the timing, an image formation for one image frame is completed. As shown in FIG. 8B, the vertical synchronizing signal is turned OFF at time T1.

During time T2 to time T3 the wavefront curvature modulating system 100 is driven so that the wavefront curvature is a at the beginning of the next modulation cycle. As described above, the image formation of one frame has finished by time T2 and during time T2 to time T3 the laser beam is not emitted.

During time T3 to T6, the operation as in time T0 to time T3 is repeated.

Thereafter, operations similar to that in time T0 to time T3 are repeatedly performed. For example, if the vertical synchronizing signal 6 repeats ON and OFF states 60 times in one second, the retinal image scanning display device 1 repeats the operation in time T0 through time T3 at a frequency of 60 times per second.

When a frame of image is formed as described above, if the vertical scanning is performed from an upper side to a lower side of the frame by the galvano mirror 21a, the image 33 formed on the retina of the observer is configured such that the observer recognizes the lower portion of the image as a close object and the upper portion of the image as a distant object, the feel of distance (depth) changing trigonometrically. That is, the observer recognized that the object 31a at the lower part of the image is a close object, and the object 30a at the upper part of the image is a distant object, as indicated in FIG. 9.

As shown in FIG. 10, the synthesized image 33 is recognized by the observer as an image viewed from arrow B. That is, the observer observes the objects 31a and 30a from the position O, and recognizes that, the objects 31a and 30a are on a slope 33a, the depth of which trigonomically changes, from the lower part to the upper part, from 1/b to 1/a.

Third Embodiment

Next, the retinal image scanning display device 1 according to the third embodiment will be described with referenced to FIGS. 1 and 11 through 14.

Figure 13:
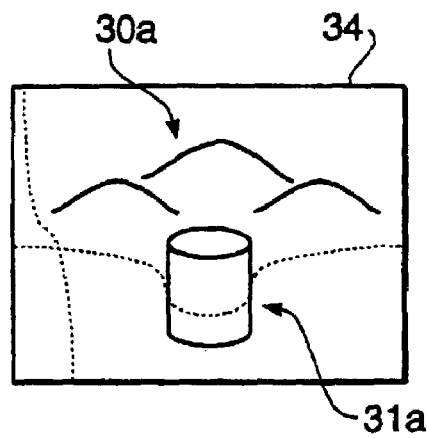
FIG. 13 shows an image in which the wavefront curvatures of the scanning beam forming the image is varied in the vertical and horizontal directions.
Figure 14:
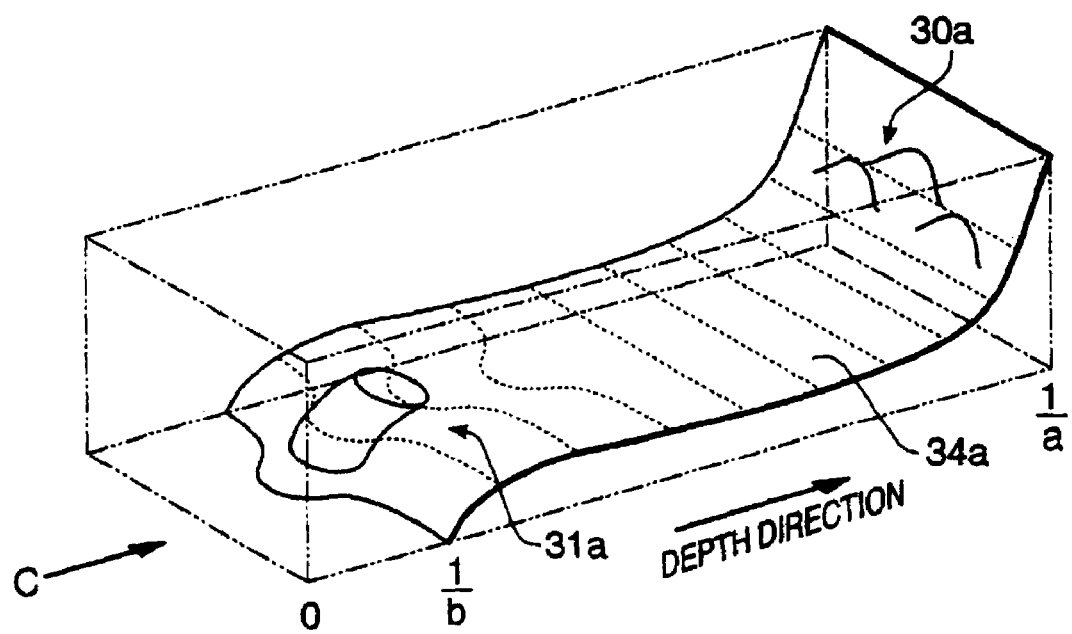
FIG. 14 shows a three-dimensional arrangement of the image shown in FIG. 10 corresponding to the distribution of the wavefront curvatures of the scanning beam forming the image.

FIGS. 11A through 11C show a timing chart showing a relationship among the modulating frequency of the wavefront curvature, horizontal synchronizing signal 5 and the vertical synchronizing signal 6. FIGS. 12A and 12B show a timing chart indicating a relationship between the wavefront curvature and the horizontal synchronizing signal 5 at about timing T1 a indicated in FIG. 11. FIG. 13 shows a synthesized image 34 which has different wavefront curvatures in vertical and horizontal directions. FIG. 14 shows arrangement of portions of the synthesized image in the depth direction.

If the period of the wavefront modulation applied by the wavefront curvature modulating system 100 is set to be equal to or less than the period of the horizontal synchronizing signal 5, an image including portions having different wavelength curvatures can be formed in the horizontal and vertical directions.

In particular, if the period of the wavefront curvature modulation applied by the wavefront curvature modulating system 100 is equal to the period of the horizontal synchronizing signal 5, at every horizontal scanning, the wavefront modulation in the horizontal direction can also be performed. At every period of the vertical scanning, the predetermined number of (i.e., the number of the horizontal scanning lines in one image) horizontal scanning is performed by the horizontal scanning system 19, thereby one frame of image being formed.

The timing chart shown in FIGS. 11A through 11C show that the modulation in the horizontal direction is overlapped on the modulation in the vertical direction so that, as shown in FIG. 13, the distant object 30a (upper portion of the image 34), the close object 31a (lower portion of the image 34), and further, the central part of the object 31a is closer than the side portions of the object 31a are expressed.

In the timing chart shown in FIGS. 11A through 11C, the wavefront curvature a corresponds to the infinity, the wavefront curvature b corresponds to the closest point in the close object. The curvature changes between b' and b in the portion of the image corresponding to the close object.

As shown in FIGS. 11A through 11, when the vertical synchronizing signal 6 is ON (at time T0), scanning of the laser beam by the galvano mirror 21a is started. At this stage, the wavefront curvature modulating system 100 is driven so that the wavefront curvature is a. During times T0 through T2 the wavefront curvature changes from a to b like a trigonometrical function. That is, the wavefront curvature of the laser beam changes from a to b synchronously with the scanning operation of the vertical scanning system 21. Then, the modulation started at time T0 is competed at time T2 at the timing, an image formation for one image frame is completed. As shown in FIG. 11C, the vertical synchronizing signal is turned OFF at time T1.

During time T0 to time T2 as shown in FIG. 12, the horizontal synchronizing signal 5 is generated periodically, and ON/OFF status is switched. Further, synchronously with the horizontal synchronizing signal 5, the wavefront curvature modulating system 100 is driven so that the wavefront curvature is modulated within each period of the horizontal scanning.

When the horizontal synchronizing signal is ON at time T0', the scanning in the horizontal scanning direction using the polygonal mirror 19a is started. At this stage, the wavefront curvature modulating system 100 is driven so that the wavefront curvature is b'. From time T0' to time T2', the wavefront curvature changes between b' and b trigonomically. Thus, the wavefront curvature of the laser beam incident on the horizontal scanning system 19 from the wavefront curvature modulating system 100 performs a sin-curve like periodical change. That is, the wavefront curvature changes from b' to b, and then back to b' during one scanning performed by the horizontal scanning system 19. The horizontal scanning started at time T0' is finished at time T2', thereby one horizontal scanning being performed. The horizontal synchronizing signal 5 is turned OFF at time T1'.

Thereafter, the operation similar to that in time T0' to time T2' are repeatedly performed in time T2' through time T4'. the periodical modulation of the wavefront curvature synchronously with the horizontal synchronizing signal 5 is repeated. It should be noted that the wavefront curvature b' varies within a range of a and b. Since the wavefront curvature b' at each side in a horizontal scanning line is smaller than the wavefront curvature b, within a horizontal scanning line, end portions correspond to distant objects and central portion corresponds to a close object, depth being changed trigonomically with the horizontal scanning line. It should be noted that the example shown in FIGS. 12A and 12B is the relationship at about timing T1a, and at different timing (e.g., an image of a remote portion within the frame is being formed), the maximum of the wavefront curvature may be less than b.

Next, from time T2 to time T3 the wavefront curvature modulating system 100 is driven such that the wavefront curvature of the laser beam is a for the next wavefront curvature modulation cycle. By time T2 the image formation of one image frame has been finished, and during time T2 to time T3 the laser beam is not emitted.

During time T3 through time T6, the operation similar to that in time T0 through time T3 is repeated. It should be noted that, in the upper portion of the image 34, the wavefront curvature remains substantially constant within the horizontal scanning line since the object is distant. Therefore, for the horizontal scanning in the upper portion of the image 34, the wavefront curvature modulation synchronously with the horizontal scanning signal is hardly performed, or not performed.

Thereafter, operations similar to that in time T0 to time T3 are repeatedly performed. For example, if the vertical synchronizing signal 6 repeats ON and OFF states 60 times in one second, the retinal image scanning display device 1 repeats the operation in time T0 through time T3 at a frequency of 60 times per second.

When a frame of image is formed as described above, if the vertical scanning is performed from an upper side to a lower side of the frame by the galvano mirror 21a, the image 34 (see FIG. 13) formed on the retina of the observer is configured such that the observer recognizes the lower portion of the image 34 as a close object and the upper portion of the image 34 as a distant object, the feel of distance (depth) changing trigonometrically. That is, the observer recognized that the object 31a at the lower part of the image 34 is a close object, and the object 30a at the upper part of the image 34 is a distant object.

Further, for the lower part of the image 34, the observer recognized that the central portion, in the horizontal direction, of the lower part of the image 34 is closer to the side portions, in the horizontal direction, of the lower part of the image 34.

As shown in FIG. 14, the synthesized image 34 is recognized by the observer as an image viewed from arrow C. That is, the observer observes the objects 31a and 30a from the position O, and recognizes that, the objects 31a and 30a are on a slope 33a, the depth of which trigonomically changes, from the lower part to the upper part, from 1/b to 1/a. Further, the observer recognizes the image 34 such that the central portion and the side portions, in the horizontal direction, have different depth.

As described above, in the retinal image scanning display device 1 according to the embodiments, the wavefront curvature modulating system is driven synchronously with the horizontal synchronizing signal 5 and the vertical synchronizing signal 6, and the wavefront curvature of the laser beam is modulated.

In particular, according to the first embodiment, the two images having different wavefront curvatures corresponding to close and distance depths are synthesized so that two objects at different depths can be recognizes in the synthesized image.

The synthesized image represents two image planes. One image plane corresponds to a close object, and the other corresponds to a distant object. If the observer focus on one image plane, with use of the optic accommodation function, the entire image is recognized as an image having a depth with respect to the focused image plane. Therefore, a natural three-dimensional feel can be achieved. Further, since the three-dimensional perspective is realized by differentiating the wavefront curvatures of portions of the image, even through the image is viewed by one eye, it is recognized the three-dimensional image. Of course, the retinal image scanning device may provide two images for both eyes of the observer, respectively.

According to the second embodiment, there is formed an image in which the wavefront curvature is smoothly changed between the upper side and lower side of the image so that the objects arranged in the upper portion and lower portion of the image are recognized to have different depths.

According to this configuration, depending on portions in the image, a close object or a distant object is represented. If the observer focus on a certain portion of the image, with use of the optic accommodation function, the entire image is recognized as an image having various depths, with respect to the focused image plane. Therefore, a natural three-dimensional feel can be achieved. Also in this case, since the three-dimensional perspective is realized by differentiating the wavefront curvatures of portions of the image, even through the image is viewed by one eye, it is recognized the three-dimensional image. Of course, the retinal image scanning device may provide two images for both eyes of the observer, respectively.

According to the third embodiment, there is provided an image in which the wavefront curvature is smoothly changed between the upper side and lower side of the image so that the objects arranged in the upper portion and lower portion of the image are recognized to have different depths as in the second embodiment. Further, the wavefront curvature is smoothly changed in the horizontal direction of the image so that the objects arranged in the horizontal direction of the image are also recognized to have different depths.

Similarly to the second embodiment, since the three-dimensional perspective is realized by differentiating the wavefront curvatures of portions of the image, even through the image is viewed by one eye, it is recognized the three-dimensional image. Of course, the retinal image scanning device may provide two images for both eyes of the observer, respectively.

Further, according to the second and third embodiments, the wavefront curvature is varied trigonomically, which reduces load to the piezoelectric actuator 105. For example, even if the wavefront curvature modulating system 100 cannot achieve a sufficient modulation speed in comparison with the image formation speed of one frame, that is, if the driving speed of the piezoelectric actuator 105 is relatively small, it becomes possible to avoid disturbance of an image at the side portion of the scanning direction, and a naturally observable three-dimensional image can be formed.

Further, since the piezoelectric actuator 105 is driven synchronously with the horizontal driving signal and/or the vertical driving signal, the movement of the piezoelectric actuator 105 is synchronized with respect to the beginning of the horizontal and/or vertical scanning operation (i.e., a scanning operation for each line and/or frame), which reduces the blur or flickering of the image.

It should be noted that the invention is not limited to the configurations described above, and can be modified in various ways without departing from the scope of the invention. For example, in the second embodiment, the wavefront curvature is modulated such that the upper portion of the image represents a distant object, while the lower portion of the image represents a close object. This may be modified such that distant objects and close objects can be represented by desired portions of the image. Further, in the third embodiment, the side portions in the horizontal direction represent objects farther from the object at the central portion of the image. This may also be modified such that the arrangement of the distant/close objects in the horizontal direction can be represented by desired portions in the horizontal direction. Of course, the above-described modifications in the vertical and horizontal direction may be combined.

The present disclosure relates to the subject matter contained in Japanese Patent Application No. 2002-042650, filed on Feb. 20, 2002, which is expressly incorporated herein by reference in its entirety.

What is claimed is:

1. A retinal image scanning device, comprising:
   at least one light source that emits a light beam;
   an intensity modulating system that modulates the intensity of the light beam emitted by said at least one light source in accordance with a video signal;
   an optical system that directs the light beam to a pupil of an observer;
   a scanning system that scans the light beam incident on the pupil of the observer, and effects horizontal and vertical scanning of the light beam in accordance with a vertical synchronizing signal and a horizontal synchronizing signal so that a two-dimensional image frame is formed on a retina of the observer, and switching the image frame with time, to display images on the retina of the observer;
   a wavefront curvature modulating system that modulates a wavefront curvature of the light beam synchronously with a synchronizing signal that makes at least one of the scanning in a horizontal direction and the scanning in a vertical direction start.

2. The retinal image scanning device according to claim 1, wherein said wavefront curvature modulating system modulates the wavefront curvature of the light beam when it is scanned in the at least one of the vertical and horizontal direction.

3. The retinal image scanning device according to claim 2, wherein said wavefront curvature modulating system modulates the wavefront curvature of the light beam continuously while the light beam is scanned within a scanning range in the at least one of the vertical and horizontal direction.

4. The retinal image scanning device according to claim 3, wherein said wavefront curvature modulating system modulates the wavefront curvature trigonometrically.

5. The retinal image scanning device according to claim 4, wherein said wavefront curvature modulating system includes a movable element and a piezoelectric actuator, said piezoelectric actuator being controlled to move trigonometrically.

6. The retinal image scanning device according to claim 3, wherein said wavefront curvature modulating system modulates the wavefront curvature of the light beam in one direction during one scanning in the at least one of the vertical and horizontal direction.

7. The retinal image scanning device according to claim 6, wherein the wavefront curvature of the light beam at one end portion within a scanning range in the at least one of the vertical and horizontal direction corresponds to a relatively closer object, the wavefront curvature of the light beam at the other end portion within the scanning range in the at least one of the vertical and horizontal direction corresponding to a relatively more distant object.

8. The retinal image scanning device according to claim 3, wherein the wavefront curvature modulating system modulates the light beam such that the wavefront curvature of the light beam at a central portion within a scanning range in the at least one of the vertical and horizontal direction represents an object at a depth different from an object at a location represented by the wavefront curvature of the light beam at end portions within the scanning range in the at least one of the vertical and horizontal direction.

9. The retinal image scanning device according to claim 8, wherein the wavefront curvature of the light beam at a central portion within a scanning range in the at least one of the vertical and horizontal direction represents an object relatively closer than an object at a location represented by the wavefront curvature of the light beam at end portions within the scanning range in the at least one of the vertical and horizontal direction.

10. The retinal image scanning device according to claim 1, wherein said wavefront curvature modulating system modulates the wavefront curvature of the light beam when it is scanned both in the vertical direction and in the horizontal direction.

11. The retinal image scanning device according to claim 10, wherein said wavefront curvature modulating system modulates the wavefront curvature of the light beam continuously while the light beam is scanned within a scanning range both in the vertical direction and the horizontal direction.

12. The retinal image scanning device according to claim 11, wherein said wavefront curvature modulating system modulates the wavefront curvature trigonometrically.

13. The retinal image scanning device according to claim 12, wherein said wavefront curvature modulating system includes a movable element and a piezoelectric actuator, said piezoelectric actuator being controlled to move trigonometrically.

14. The retinal image scanning device according to claim 11, wherein the wavefront curvature of the light beam at one end portion within a scanning range in the at least one of the vertical and horizontal direction corresponds to a relatively closer object, the wavefront curvature of the light beam at the other end portion within the scanning range in the at least one of the vertical and horizontal direction corresponding to a relatively more distant object.

15. The retinal image scanning device according to claim 14, wherein in the at least one of the vertical and horizontal direction is a vertical direction.

16. The retinal image scanning device according to claim 14, wherein the wavefront curvature modulating system modulates the light beam such that the wavefront curvature of the light beam at a central portion within a scanning range in the horizontal direction represents an object at a depth different from an object at a location represented by the wavefront curvature of the light beam at end portions within the scanning range in the horizontal direction.

17. The retinal image scanning device according to claim 16, wherein the wavefront curvature of the light beam at a central portion within a scanning range in the horizontal direction represents an object relatively closer than an object at a location represented by the wavefront curvature of the light beam at end portions within the scanning range in the horizontal direction.

18. The retinal image scanning device according to claim 16,
wherein, for the one end portion within the scanning range in the vertical direction, the wavefront curvature of the light beam in the horizontal scanning direction is changed minimally, and
wherein, for the other end portion within the scanning range in the vertical direction, the wavefront curvature of the light beam in the horizontal scanning direction is changed such that the wavefront curvature of the light beam at a central portion within the scanning range in the horizontal direction represents an object/at a depth different from an object at a location represented by the wavefront curvature of the light beam at end portions within the scanning range in the horizontal direction.

19. The retinal image scanning device according to claim 1, further comprising a synchronizing signal generating system that outputs a vertical synchronizing signal having a vertical frequency and a horizontal synchronizing signal having a horizontal frequency, said scanning system scans the light beam in the vertical direction and in the horizontal direction synchronously with the vertical and horizontal synchronizing signals, respectively.

20. The retinal image scanning device according to claim 19, wherein the horizontal frequency is higher than the vertical frequency, said wavefront curvature modulating system modulating the wavefront curvature of the light beam such that the wavefront curvature changes minimally in the horizontal direction, and the wavefront curvature changes in the vertical direction.

21. A retinal image scanning device according to claim 1, wherein the wavefront curvature modulating system modulates the wavefront curvature of the light beam synchronously with the vertical synchronizing signal when the light beam is scanned in the vertical direction.

22. The retinal image scanning device according to claim 21, wherein a vertical period, which is a reciprocal number of the vertical frequency, of the vertical synchronizing signal is substantially equal to a period of modulation, in the vertical direction, performed by said wavefront modulating system.

23. The retinal image scanning device according to claim 21, wherein a vertical period, which is a reciprocal number of the vertical frequency, of the vertical synchronizing signal is substantially a half period of modulation, in the vertical direction, performed by said wavefront modulating system.

24. The retinal image scanning device according to claim 21, wherein a horizontal period, which is a reciprocal number of the horizontal frequency, of the horizontal synchronizing signal is substantially equal to a period of modulation, in the horizontal direction, performed by said wavefront modulating system.

25. The retinal image scanning device according to claim 24, wherein a vertical period, which is a reciprocal number of the vertical frequency, of the vertical synchronizing signal is substantially a half a period of modulation, in the vertical direction, performed by said wavefront modulating system.

26. A retinal image scanning device, comprising:
at least one light source that emits a light beam;
an intensity modulating system that modulates the intensity of the light beam emitted by said at least one light source in accordance with a video signal supplied from an external device;
an optical system that directs the light beam to a pupil of an observer;
a scanning system scans the light beam incident on the pupil of the observer, and that effects horizontal and vertical scanning of the light beam in accordance with a vertical synchronizing signal and a horizontal synchronizing signal so that a two-dimensional image frame is formed on a retina of the observer, and switching the image frame with time, to display images on the retina of the observer;
a circuit that supplies a depth signal used for controlling a wavefront curvature of the light beam during at least one of the vertical and horizontal scanning of the light beam, a period of modulation of the wavefront curvature being set to be substantially twice of or equal to the at least one of the vertical and horizontal synchronizing signal, the depth signal being generated in accordance with the video signal; and
a wavefront curvature modulating system that modulates a wavefront curvature of the light beam synchronously with a synchronizing signal that makes at least one of the scanning in a horizontal direction and the scanning in a vertical direction start.

27. A retinal image scanning device, comprising:
at least one light source that emits a light beam;
an intensity modulating system that modulates the intensity of the light beam emitted by said at least one light source in accordance with a video signal;

an optical system that directs the light beam to a pupil of an observer;

a scanning system that scans the light beam incident on the pupil of the observer, and effects horizontal and vertical scanning of the light beam in accordance with a vertical synchronizing signal and a horizontal synchronizing signal so that a two-dimensional image frame is formed on a retina of the observer, and switching the image frame with time, to display images on the retina of the observer;

a wavefront curvature modulating system that modulates a wavefront curvature of the light beam, wherein the wavefront curvature modulating system operates such that the wavefront curvature of the light beam forming the same image frame is substantially constant, the wavefront curvature of the light beam being changed only when frame images are switched from one to another.

* * * * *